US010567302B2

(12) United States Patent
Petys et al.

(10) Patent No.: US 10,567,302 B2
(45) Date of Patent: Feb. 18, 2020

(54) ENTERPRISE BUSINESS MOBILE DASHBOARD

(71) Applicant: AT&T INTELLECTUAL PROPERTY I, LP, Atlanta, GA (US)

(72) Inventors: Michael Petys, Seminole, FL (US); Shiu Y. Chong, Fair Haven, NJ (US); Andreea Cuculeanu, Middletown, NJ (US); Alan N Dunn, Johns Creek, GA (US); Andrew J Laird, Brookfield, CT (US); Timothy Smith, Pelham, GA (US); Kenneth A. Williams, Manasquan, NJ (US); Philip Yeung, Somers, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 504 days.

(21) Appl. No.: 15/169,874

(22) Filed: Jun. 1, 2016

(65) Prior Publication Data

US 2017/0353468 A1     Dec. 7, 2017

(51) Int. Cl.
*H04L 12/911*    (2013.01)

(52) U.S. Cl.
CPC .................. *H04L 47/70* (2013.01)

(58) Field of Classification Search
CPC ....... H04L 9/32; H04L 63/0892; H04W 12/00
USPC ................................................ 713/150–155
See application file for complete search history.

(56) References Cited

U.S. PATENT DOCUMENTS

| | | | | |
|---|---|---|---|---|
| 8,185,939 | B2* | 5/2012 | Roberts | G06F 21/41 726/19 |
| 8,713,446 | B2* | 4/2014 | Vogel | G06F 9/44505 715/744 |
| 8,726,403 | B2* | 5/2014 | Huang | H04L 9/083 380/201 |
| 9,094,701 | B2* | 7/2015 | Mildner | H04L 65/1073 |
| 9,147,085 | B2* | 9/2015 | Bender | G06F 21/629 |
| 9,230,126 | B2* | 1/2016 | Handal | G06F 21/10 |
| 9,306,954 | B2* | 4/2016 | Movassaghi | H04L 63/105 |
| 9,344,843 | B2* | 5/2016 | Niedermaier | H04W 4/021 |

(Continued)

FOREIGN PATENT DOCUMENTS

WO     2013188105 A1     12/2013

*Primary Examiner* — Lynn D Feild
*Assistant Examiner* — Viral S Lakhia
(74) *Attorney, Agent, or Firm* — Guntin & Gust, PLC; Douglas Schnabel (57) ABSTRACT

Aspects of the subject disclosure may include, for example, a server, comprising a processing system including a processor and a memory that stores executable instructions that, when executed by the processing system, facilitate performance of operations including receiving a request from a mobile device of a user having an account to access a first mobile application of a plurality of mobile applications, wherein each of the plurality of mobile applications is embedded into a single bundled application, and wherein the single bundled application is downloaded onto the mobile device, determining whether the mobile device has permissions for access to the first mobile application and whether the mobile device is executing the single bundled application, and sending permissions data to the mobile device that enables the mobile device via the account to access the first mobile application. Other embodiments are disclosed.

20 Claims, 7 Drawing Sheets

(56) References Cited

U.S. PATENT DOCUMENTS

| | | |
|---|---|---|
| 9,442,709 B1* | 9/2016 | Delker ............... G06F 8/61 |
| 9,569,587 B2* | 2/2017 | Ansari ............... H04L 63/08 |
| 9,571,282 B1* | 2/2017 | Aggarwal ............ H04L 9/32 |
| 9,984,246 B2* | 5/2018 | Yan ................. G06F 21/31 |
| 10,305,876 B2* | 5/2019 | Mazandarany ......... H04L 9/32 |
| 2009/0234955 A1 | 9/2009 | Hanley et al. |
| 2012/0030567 A1 | 2/2012 | Victor et al. |
| 2012/0041829 A1* | 2/2012 | Rothschild .......... G06Q 30/06 705/26.1 |
| 2012/0221384 A1* | 8/2012 | Avadhanam .......... G06F 21/10 705/14.4 |
| 2013/0054962 A1* | 2/2013 | Chawla .............. H04L 9/321 713/156 |
| 2013/0080636 A1* | 3/2013 | Friedman ............ H04L 41/08 709/225 |
| 2013/0086211 A1* | 4/2013 | Sondhi .............. G06F 21/41 709/217 |
| 2013/0166623 A1 | 6/2013 | Stanwood et al. |
| 2013/0173919 A1* | 7/2013 | Jogand-Coulomb ....... H04L 63/062 713/168 |
| 2013/0283397 A1* | 10/2013 | Griffin ............. H04W 4/001 726/28 |
| 2013/0297050 A1 | 11/2013 | Reichard et al. |
| 2014/0095874 A1* | 4/2014 | Desai ............... H04L 63/0815 713/168 |
| 2014/0135160 A1* | 5/2014 | Kaiser .............. F16H 55/30 474/152 |
| 2014/0165209 A1* | 6/2014 | Yin ................. H04L 63/0823 726/26 |
| 2014/0201150 A1 | 7/2014 | Kumarasamy et al. |
| 2014/0250511 A1 | 9/2014 | Kendall et al. |
| 2014/0359604 A1 | 12/2014 | Salameh |
| 2014/0359606 A1* | 12/2014 | Salameh ............. G06F 8/61 717/178 |
| 2015/0074259 A1* | 3/2015 | Ansari .............. H04L 67/02 709/224 |
| 2015/0095975 A1* | 4/2015 | Barton .............. G06F 9/45533 726/1 |
| 2015/0106803 A1 | 4/2015 | Srivastava |
| 2015/0133076 A1 | 5/2015 | Brough |
| 2016/0034711 A1 | 2/2016 | Poornachandran |
| 2016/0277261 A9* | 9/2016 | Ansari .............. H04L 67/02 |
| 2016/0378451 A1* | 12/2016 | Walker .............. G06F 8/52 717/111 |
| 2017/0005798 A1* | 1/2017 | Chow ................ H04W 4/60 |
| 2018/0191858 A1* | 7/2018 | Jennequin ........... H04L 12/2818 |

* cited by examiner

ENTERPRISE BUSINESS MOBILE DASHBOARD

FIELD OF THE DISCLOSURE

The subject disclosure relates to a plurality of mobile applications merged into a single bundled application that serves as a mobile dashboard.

BACKGROUND

Operating systems for mobile handheld devices commonly refer to applications as "apps." Apps are downloaded from an app store onto the mobile device, and launched when a user of the mobile device taps an icon associated with the app on the mobile device's user interface (touch screen). Individual user account information is typically associated with each app. Traditionally, multiple individual mobile apps are downloaded, requiring multiple user logins/authorizations to each individual mobile app that supports a common business objective. Furthermore, updates to each app are pushed out to mobile devices sequentially, i.e., on a per app basis.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a system for implementing a plurality of mobile applications embedded into a single bundled application. Other embodiments are described in the subject disclosure.

One or more aspects of the subject disclosure include an app server that provides an interface between established client/server systems and mobile device apps, determines whether particular mobile device apps are open and executing on a user's mobile device, and routes data to open mobile device apps from the client/server systems.

One or more aspects of the subject disclosure include receiving a request from a mobile device of a user having an account, the request received via a provisioning interface, the request requesting access to a first mobile application of a plurality of mobile applications, wherein each of the plurality of mobile applications is embedded into a single bundled application, and wherein the single bundled application is downloaded onto the mobile device, determining whether the mobile device has permissions for access to the first mobile application of the plurality of mobile applications in a provisioning database, determining whether the mobile device is executing the single bundled application, responsive to a determination that the mobile device has permissions for access to the first mobile application, and sending permissions data via the provisioning interface to the mobile device, wherein the permissions data enables the mobile device via the account to access the first mobile application, responsive to a determination that the single bundled application is executing on the mobile device.

One or more aspects of the subject disclosure include executing a single bundled application on a mobile device, wherein the single bundled application comprises a plurality of mobile applications embedded therein, sending authenticating information for a user to an authentication server responsive to executing the single bundled application, receiving authorization data from the authentication server, displaying a selection screen for one or more authorized applications of the plurality of mobile applications, wherein the selection screen comprises a user prompt to access an authorized application, and wherein the one or more authorized applications displayed are responsive to the authorization data, receiving a selection of the user prompt for a first mobile application of the one or more authorized applications, locating application permissions stored on the mobile device; and launching the first mobile application responsive to locating application permissions stored on the mobile device for the first mobile application.

One or more aspects of the subject disclosure include receiving, by an app server including a processor, data from a client server system via a client server application programming interface, wherein the data comprises a mobile application name and account code, wherein the client server system has been authenticated by an authentication server, wherein the mobile application name is for a mobile application in a plurality of mobile applications that are embedded into a single bundled application, retrieving, by the app server, a first list of mobile users permitted access to the mobile application and data based on the account code from a permissions database, determining, by the app server, a second list of mobile users executing the mobile application on a mobile device, transmitting, by the app server, the data to a mobile device of each user on the second list, wherein the mobile application is updated to incorporate the data, and sending, by the app server, an alert to the mobile device of each user on the first list but not on the second list, wherein the alert indicates that updated data is available for the mobile application.

Figure 1:
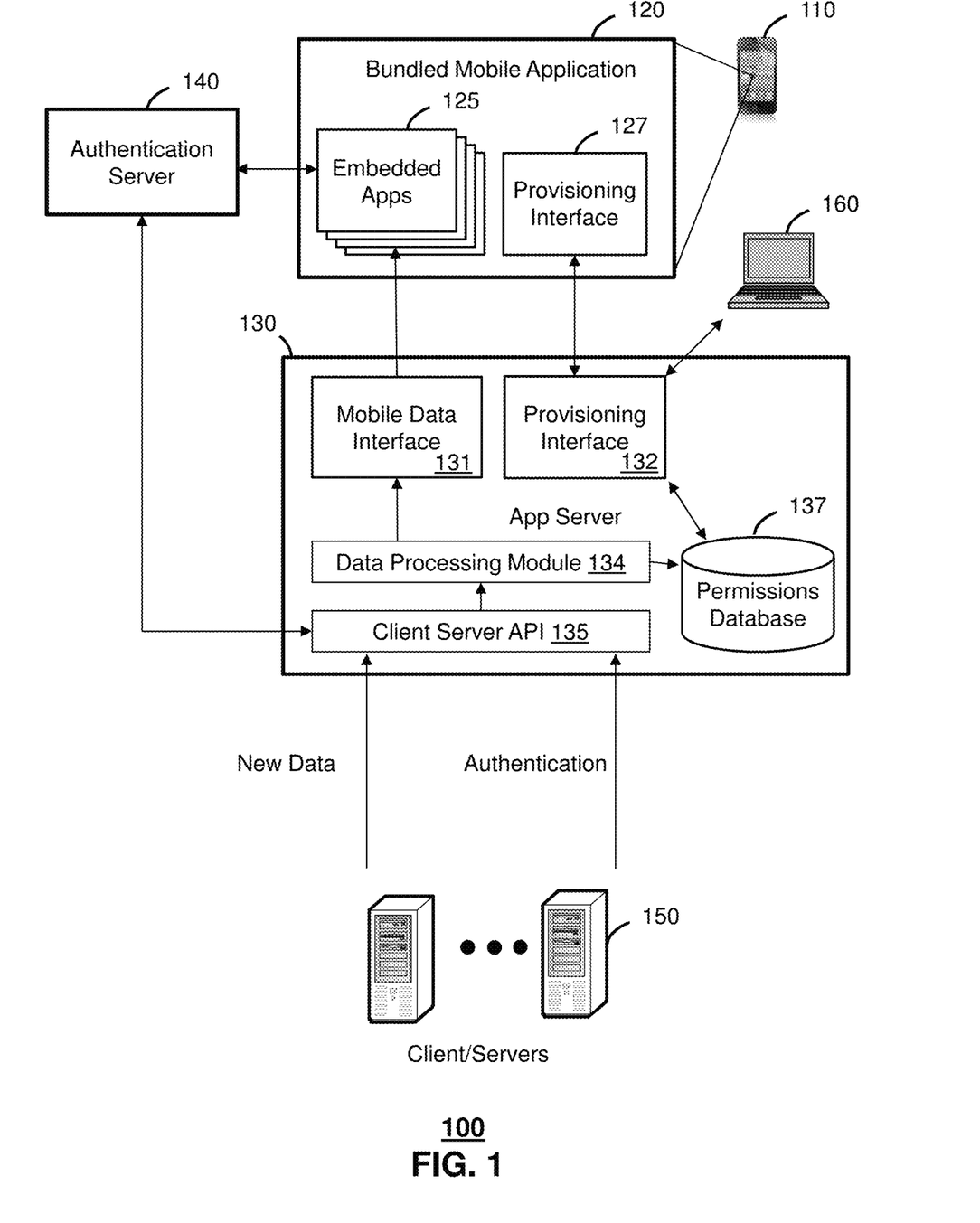
FIG. 1 depicts an illustrative embodiment of a system for managing and operating a plurality of mobile applications embedded into a single bundled application.

FIG. 1 depicts an illustrative embodiment of a system for implementing a plurality of mobile applications embedded into a single bundled application. As illustrated in FIG. 1, the system 100 includes a mobile device 110, having downloaded thereon a single bundled app 120, an app server 130, an authentication server 140, and client/server(s) 150 at the backend of system 100. Also illustrated is an optional component of system 100, a computer 160 for an administrator that is in data communication with the app server 130.

Mobile device 110 has a user interface, which may include a plurality of icons, each icon representing an app that was downloaded into memory of the mobile device 110. The hardware of mobile device 110 is described in more detail below with respect to FIG. 7. In an embodiment, one of the apps is a single bundled app 120.

Single bundled app 120 comprises a plurality of embedded mobile apps 125 and a provisioning interface 127. The single bundled app 120 is designed as a container to support multiple services. The single bundled app 120 may contain all customized implementations for each app of the embedded mobile apps 125, controlled by one or more permissions that reside on a backend server application(s), provided through the provisioning interface 127. Each embedded mobile app 125 may be fully customizable and include unique requirements. In one embodiment, the single bundled app 120 can allow users to only view the embedded mobile apps 125 that provide service implementations for which the users are provisioned, by the client/server(s) 150. In one embodiment, embedded mobile apps 125 can be added or removed dynamically from the single bundled app 120.

In one embodiment, an embedded mobile app 125 can be a Web page app. In a Web page app, server side web pages are accessed by the mobile device browser. In one embodiment, no additional code is installed on the mobile device. In this embodiment, client/server(s) 150 are essentially Web servers that serve Web pages to the Web page app.

In another embodiment, an embedded mobile app 125 can be a native app. Native apps are written in the native language for the mobile device 110. For example, native apps are written in Objective-C for iOS, or in Java for Android mobile devices. The object code for the native app is downloaded and installed on device. Client/server(s) 150 are essentially data servers that provide information obtained by native apps.

In another embodiment, an embedded mobile app 125 can be a hybrid of a Web page app and a native app. Hybrid apps, for example, can be written in JavaScript/HTML5/CSS3 and use the Browser engine (Webkit for iOS/Android), but not the browser itself. The object code for a hybrid app is downloaded and installed on the mobile device 110. Client/server(s) 150 function as Web servers, but may also provide data feeds.

In one embodiment, the single bundled app 120 and/or embedded mobile apps 125 are programmed in Adobe open-source products built around Cordova. Cordova provides a set of plugins that give hybrid apps access to device functionality. Cordova supports creation of plugins for additional functionality. Cordova is a set of programming tools that are written in JavaScript. In addition, the single bundled app 120 and/or embedded mobile apps 125 may include an open source web application framework maintained by Google, known as AngularJS. AngularJS is a framework for model-view-controller (MVC) client side architecture that simplifies development of single page web applications. AngularJS supports two-way data binding, and is also a set of programming tools that are written in JavaScript. The embedded mobile app 125 may be implemented such that no data is stored on the mobile device 110, but is instead retrieved from client/server(s) 150. The embedded mobile app 125 may include a reload icon that appears on the screen of the mobile device 110 whenever new updated data is available on client/server(s) 150. In another embodiment, the embedded mobile app 125 may store most recent data on the mobile device 110, and may provide the user with the ability to retrieve data reports for specific date/time periods entered by the user. The client/server(s) 150 may push new or updated data automatically through app server 130, which may force open embedded mobile apps 125 using Server Sent Events.

As an example of a hybrid app, in an embedded mobile app 125 for a network business, the app can provide network performance, customer and network device performance, Key Performance Indicators (KPI), and/or analytics. A consolidated dashboard view of embedded mobile app 125 allows for identification of problem areas in the network, potential network revenue uplift based on network issues, detailed trouble ticketing information associated with a customer data center or device anywhere in the world. Settings can be modified by the user to customize the alarms displayed, such as sorting by severity of the alarm (i.e., critical, major, minor, or cleared), sorting by chronology (default), toggling receipt of critical, major or minor alarms, filtering by node or ring name. Other settings can include a quiet time to prevent receiving Push Notifications at certain times of the day or night.

Delivery of multiple distinct business services may be consolidated by downloading the single bundled app 120 onto the mobile device 110. The single bundled app 120 reduces the effort of downloading individual mobile applications. In addition, launching, i.e., loading and executing the single bundled app 120 on the mobile device 110, eliminates multiple user logins for multiple apps that support enterprise business services, by embedding multiple mobile apps within the single bundled app 120. When the mobile device 110 launches the single bundled app 120, the single bundled app 120 provides authentication data to authentication server 140. Following authentication, the provisioning interface 127 of the single bundled app 120 contacts the app server 130 to obtain the permissions of embedded mobile apps 125 from the app server 130. If the permissions returned by the app server 130 are different than those stored locally on the mobile device 110, the local permissions may be updated and the display of embedded mobile apps 125 modified to reflect the changes.

Existing mobile application solutions that access to multiple, individual information systems can be combined into a consolidated dashboard view to be able to identify problem areas in a large network data management enterprise. App server 130 provides the middleware to interface each of the embedded mobile apps 125 with client/server(s) 150, and enables the consolidation of embedded mobile apps 125 into the single bundled app 120. App server 130 comprises a mobile data interface 131, a provisioning interface 132, a data processing module 134, a client/server API 135, and a permissions database 137. In one embodiment, app server 130 executes a JBOSS EAP 6.2 Middleware. The app server 130 may be programmed in Java utilizing Struts 2 Web framework. The app server 130 may provide data to embedded mobile apps 125 using JavaScript Object Notation (JSON) formatted data.

Mobile data interface 131 provides a conduit for sending data from the client/server(s) 150 to the embedded mobile apps 125. Mobile data interface 131 determines which users have an embedded mobile app 125 open for which the data is intended. Mobile data interface 131 transmits data to the mobile devices executing the embedded mobile apps 125. The embedded mobile apps 125 may be updated to incorporate the data. In one embodiment, the mobile data interface 131 may use Restful Web Services for receiving and processing alarms and alerts.

When the mobile data interface 131 determines that a user's mobile device is not executing an embedded mobile app 125, the mobile data interface 131 may send an alert to the mobile device to inform the user that new or updated data is available. The mobile data interface 131 may use a mobile device vendor's Push Notification Service to send the alert.

Upon receiving contact from the provisioning interface 127, indicating that the single bundled app 120 has been launched, provisioning interface 132 retrieves permissions data from permissions database 137. The provisioning interface 132 provides permissions data for all allowed accounts to the mobile device 110 through the provisioning interface 127. Similarly, when a user requests access to an embedded mobile app 125 for which the user does not yet have permissions, the request is sent to the provisioning interface 132, which confirms that the user does not yet have permissions to access the embedded mobile app 125. In one embodiment, the provisioning interface 132 may forward the request via email to an administrator on the computer 160, for example. The administrator may verify an appropriate business need for the user to access the embedded mobile app 125, and can update permissions database 137 through provisioning interface 132, thereby indicating that the account and the mobile device have been granted access to the embedded mobile app 125. For example, an administrator can log onto a web application of provisioning interface 132 and provision the user for the embedded mobile app 125 by entering an initial list of accounts allowed for the user.

Further provisioning may be accomplished automatically, based on the condition of a mobile device or an account. For example, provisioning interface 132 may send an inquiry to a billing system (not illustrated) including the request, the mobile device, and the account. The provisioning interface 132 may receive an indication from the billing system that payment has been received by the billing system for the account. The provisioning interface 132 may provide an update to the permissions database 137 indicating that the account and the mobile device have been granted access to the embedded mobile app 125.

In another example of automatic provisioning, provisioning interface 132 may provide access to the embedded mobile app 125 only when the mobile device 110 is within a prescribed location. In this example, provisioning interface 132 may determine a location of mobile device 110, and then determine whether the mobile device 110 is within the prescribed location. Then the provisioning interface 132 may update the permissions database 137 to indicate that the account and the mobile device 110 have been granted access to the embedded mobile app 125. The provisioning interface 132 may constantly monitor the location of the mobile device 110, and may remove permissions, as described elsewhere herein. The location based provisioning can be based on rules associated with particular locations, such as a particular location not permitting particular functions of a mobile device to be performed therefore the application providing those functions is otherwise inaccessible at that location or otherwise disabled.

In another example of automatic provisioning, provisioning interface 132 may provide access to the embedded mobile app 125 based on the condition of equipment, such as within an enterprise. For example, provisioning interface 132 may be apprised of the condition of an enterprise mobile network that supplies data services to users, such as the IPTV system described below in connection with FIG. 4. The provisioning interface 132 may update the permissions database 137 to indicate that an account and the mobile device 110 associated with a user have been granted access to the embedded mobile app 125 based on the condition of the mobile network.

Data processing module 134 retrieves the identify information for mobile users permitted access from the permissions database 137 by querying both the embedded application name and account from the permissions database 137. In one embodiment, a customized relational Oracle database is used to save device settings and user provisioning information. The app server 130 may use Hibernate/JPA to access the permissions database 137.

Data processing module 134 passes application data and user lists to the mobile data interface 131. The data processing module 134 may use JBoss JMS queues to handle the alerts and notifications being sent to mobile devices 110. The data processing module 134 may validate all data, such as verifying proper case, default values, etc.

When the client/server(s) 150 have new or updated application data to send to an embedded mobile app 125, the client/server(s) 150 send the data to client/server API 135 of the app server 130. Contained within the data is the embedded mobile application name and account code associated with the application data.

By providing app server 130, many mobile apps can be combined into a single bundled app 120 that can, for example, provide insight into the operation of a worldwide data network, potential network revenue uplift based on network issues, detailed trouble ticketing information associated with a customer data center or device anywhere in the world. This mobile apps provide an enterprise view that can be adapted into one or more customized views based on a customer's preference or business need.

In some embodiments, permissions in effect when an embedded mobile app 125 was last used are stored on the mobile device 110. These permissions are retrieved allowing the user to be routed to a particular implementation by way of a single permission. Alternatively, multiple permissions can be stored on the mobile device 110 for different implementations, allowing a user to select a particular implementation that applies a single permission.

Additional items can be added and/or updated as needed by the service provider using an instance of a base application of the single bundled app 120 with new permissions and data sources on app server 130 and/or client/server(s) 150. For users with multiple current permissions, each embedded mobile app 125 may provide an icon allowing the user to return to the implementation selection screen. After a selection is made, the process of establishing permissions and data flow is repeated. If at any time a permission to the currently selected embedded mobile app 125 is revoked, the user is notified to authenticate and reinitialize the single bundled app 120. At the point of revocation, the user is prevented from using any of the embedded mobile app 125 features.

Authentication server 140 receives authentication data, such as a mobile device identifier, user name, account name, and/or password, from the user's mobile device when single bundled app 120 is launched on the mobile device 110. Authentication server 140 also authenticates the client/server(s) 150, to ensure that data processing functions supplied by client/server(s) 150 are authorized business enterprise functions. Authentication server 140 can receive such authentication directly from client/server(s) 150, or such authentication data may be routed through the client/server API 135 of app server 130, as shown in FIG. 1.

Client/server(s) 150 provide all the data processing functions to support each of the embedded mobile apps 125. In one embodiment, embedded mobile apps 125 periodically poll the client/server(s) 150 for new or updated data, such as alarms. In an alternative embodiment, client/server(s) 150 push new alarm data to embedded mobile apps 125. When an embedded mobile app 125 is not executing on the mobile device 110 (i.e., the app is "closed"), client/server(s) 150 may cause a special notice, known as a Push Notification, to be sent to a user to alert the users that new alarms are available. In one embodiment, client/server(s) 150 include an alarm manager that correlates new alarms with previous occurrences so the embedded mobile app 125 only shows the most recent occurrence of an alarm. In one embodiment, the alarm manager keeps alarm data for 30 days in a file system storage with in-memory storage for performance.

For purposes of illustration, app server 130, authentication server 140, and client/server(s) 150 are shown as separate computer processing systems. However, as is known to one of ordinary skill in the art, the data processing functions of app server 130, authentication server 140, and client/server(s) 150 described herein may be performed on the hardware of a single computer processor. Alternatively, the data processing functions of app server 130, authentication server 140, and client/server(s) 150 may be spread among several computer processors, real or virtual, in a distributed processing environment.

Figure 2:
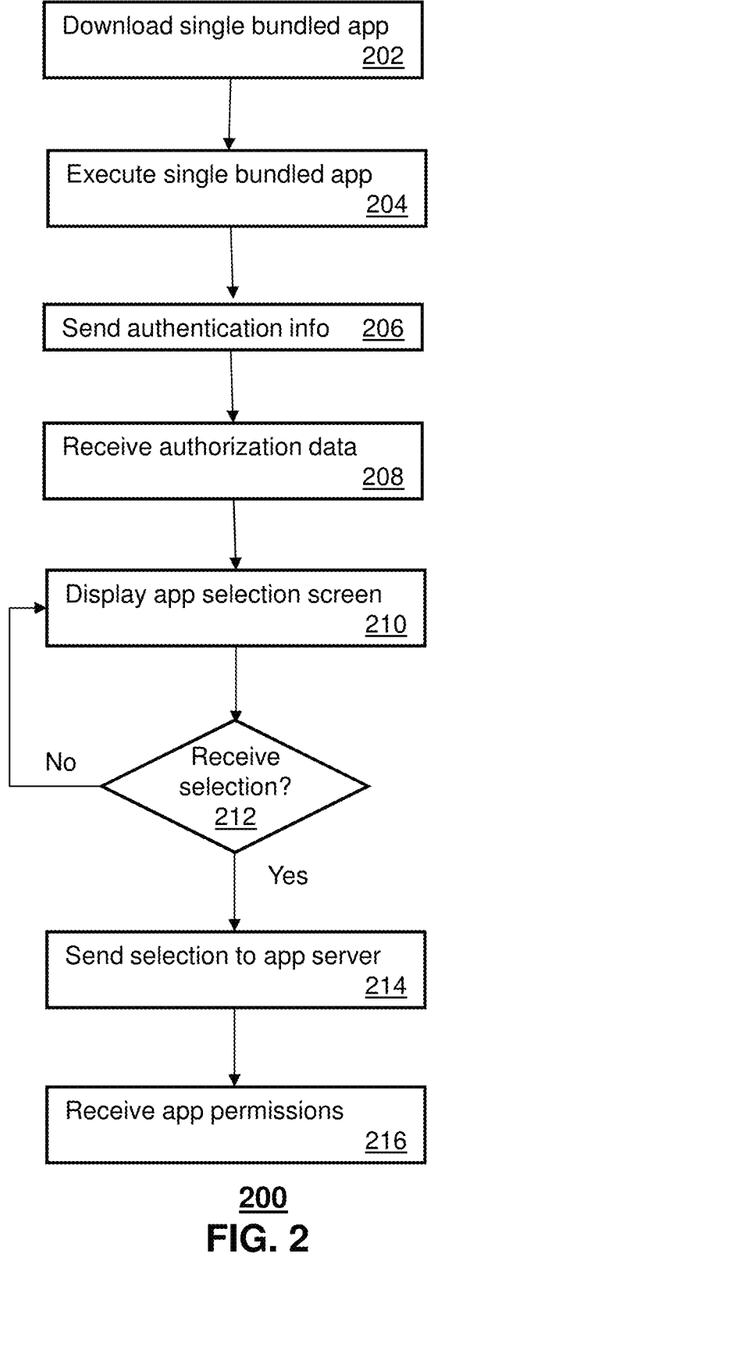
FIG. 2 depicts an illustrative embodiment of a method 200 used in portions of the system described in FIG. 1.

FIG. 2 depicts an illustrative embodiment of a method 200 used in portions of the system described in FIG. 1. In particular, FIG. 2 illustrates operations that are performed by embodiments of the system when a user launches the single bundled app 120. As shown in step 202, the user downloads the single bundled app 120 from a source, through a data connection. The source is typically an app store, but the app can be side loaded from media, if necessary. In step 204, the user locates and activates an icon associated with the single bundled app 120, which causes the single bundled app 120 to be loaded into the memory of the mobile device 110 and starts execution of the program code associated with the single bundled app 120. In turn, in step 206, authentication data is sent from the mobile device 110 to the authentication server 140. Such authentication data may be stored on the mobile device 110, or may be queried from the user.

In step 208, the mobile device 110 receives authorization data from the authentication server 140. With the authorization data, the mobile device 110 may retrieve permissions for the embedded mobile apps 125 from local storage of the mobile device 110.

If the user has permissions for multiple embedded mobile apps 125, then in step 210, the single bundled app 120 displays a selection screen for a choice from among the multiple embedded mobile apps 125. If the user merely has permissions for one embedded mobile app 125, then a home page for the embedded application is displayed. At this time, the mobile device 110 contacts the app server 130 via the provisioning interface 127. In one embodiment, the app server 130, via provisioning interface 132, will search the permissions database 137 and return permissions for the embedded mobile apps 125.

In step 212, the single bundled app 120 checks whether the user has selected one of the embedded mobile apps 125. If not, processing repeats at step 210. If the user has made a selection, then, in step 214, the selection is passed along to app server 130. The mobile data interface 131 begins the process of establishing a data flow path to the selected embedded mobile app 125 and/or other embedded mobile apps 125 that are allowed.

In step 216, the mobile device 110 receives permissions for the selected embedded mobile app 125. If the permissions returned by the provisioning interface 132 are different than the permissions stored locally, then the provisioning interface 127 may update the permissions locally stored on the mobile device 110, and the embedded mobile app 125 is modified to reflect the changes set forth in the permissions transmitted by the app server 130 to the mobile device 110.

Figure 3:
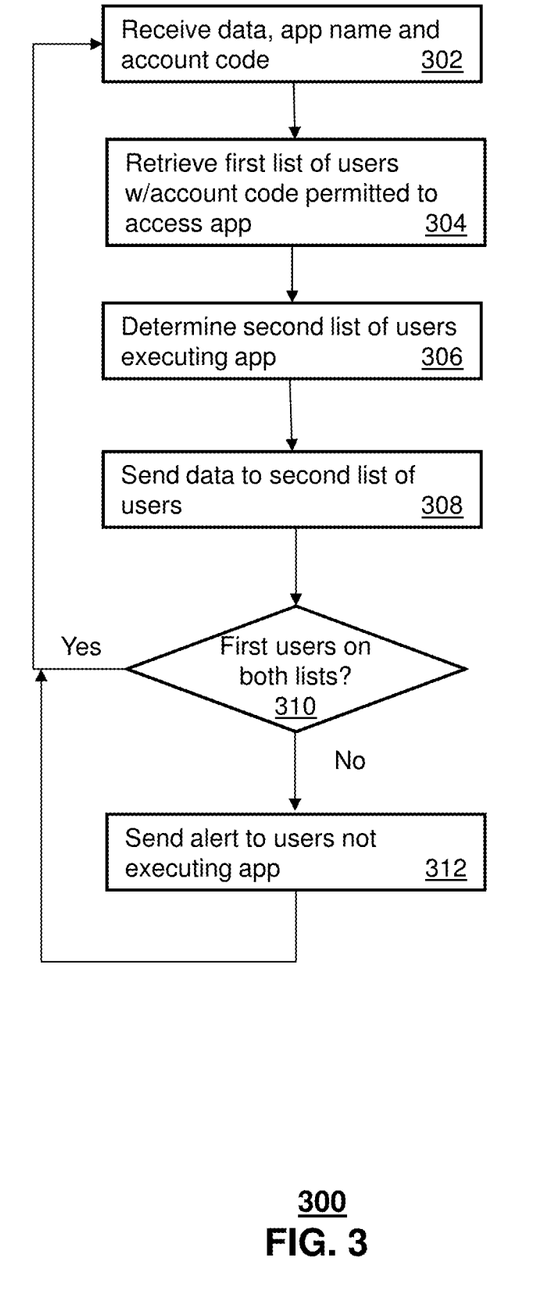
FIG. 3 depicts an illustrative embodiment of a method 300 used in portions of the system described in FIG. 1.

FIG. 3 depicts an illustrative embodiment of a method 300 used in portions of the system described in FIG. 1. In particular, FIG. 3 illustrates operations that are performed by embodiments of the system when the client/server(s) 150 have new data for the embedded mobile apps 125.

In step 302, the app server 130 receives data from the client/server(s) 150, the data including a name of an embedded mobile app 125 and an account code associated with the data. The client/server(s) 150 send this data via the client/server API 135 of the app server 130.

In step 304, the client/server API 135 passes the data to the data processing module 134. In turn, the data processing module 134 retrieves a first list of users permitted to access the embedded mobile app 125 named in the data from permissions database 137, based on the name of the embedded mobile app 125 and the account code. The data processing module 134 then passes the data and the first list of users to the mobile data interface 131.

Next, in step 306, the mobile data interface 131 determines a second list of users that are executing the named embedded mobile app 125.

Then, in step 308, the mobile data interface 131 sends the data to the mobile device 110 of the users on the second list. The embedded mobile app 125 may be updated to incorporate the new data received from the mobile data interface 131.

Next, in step 310, the mobile data interface 131 determines which users are on both the first list and the second list. For users that are on both lists, the operations continue back to step 302.

For users on the first list that are not on both lists, the operations continue with step 312. For these users whose mobile device 110 is not currently executing the embedded mobile app 125, the mobile data interface 131 sends an alert to the mobile device 110. In one embodiment, a device vendor's Push Notification Service is used to send the alert to the mobile device 110 on the first list, but not the second list.

While for purposes of simplicity of explanation, the respective processes are shown and described as a series of blocks in FIGS. 2 and 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
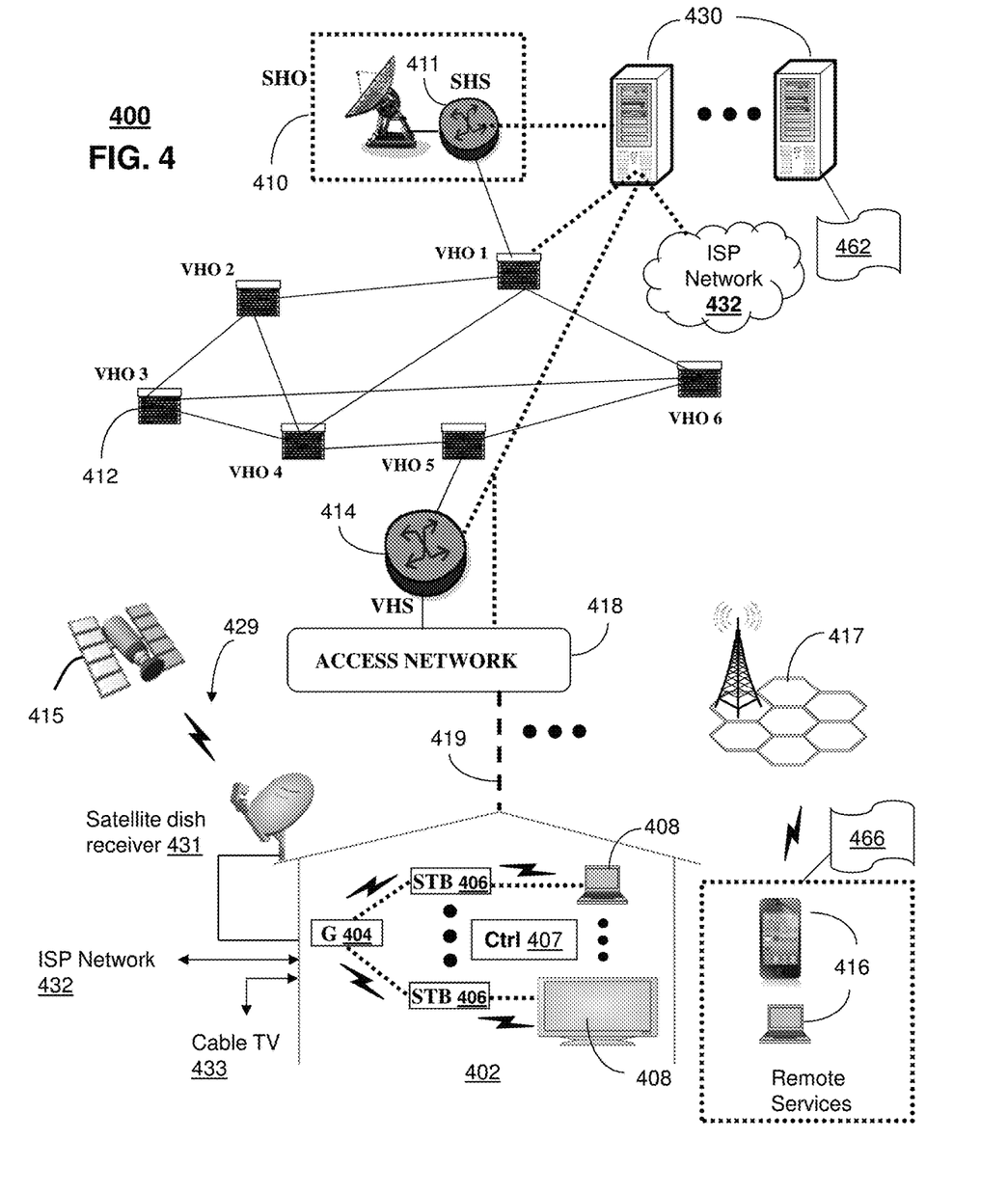
FIGS. 4-5 depict illustrative embodiments of communication systems that provide enterprise media services coupled with a system for managing and operating a plurality of mobile applications embedded into a single bundled application.

FIG. 4 depicts an illustrative embodiment of a first communication system 400 for delivering media content. The communication system 400 can represent an Internet Protocol Television (IPTV) media system. Communication system 400 can be overlaid or operably coupled with the single bundled app 120 as another representative embodiment of communication system 400. For instance, one or more devices illustrated in the communication system 400 of FIG. 4 can provide the functionality of the app server 130, the authentication server 140, or the client/server(s) 150.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP Network 432 to wireline media devices 408 or wireless communication devices 416. For example, the web portal services provided over the ISP Network 432 can supply data to one or more embedded mobile apps 125 in the single bundled app 120 concerning the operational status of the IPTV media system.

Communication system 400 can also provide for all or a portion of the computing devices 430 to function as a client/server system (herein referred to as client/server system 430). The client/server system 430 can use computing and communication technology to perform function 462, which can include among other things, the functions of the app server 130, the authentication server 140, and/or client/server(s) 150 disclosed in the text supporting FIG. 1, or the techniques described by the methods disclosed in FIGS. 2 and 3. For instance, function 462 of server 430 can be similar to the functions described for app server 130 of FIG. 3 in accordance with the method 300 illustrated therein. The wireless communication devices 416 can be provisioned with software functions 466 to utilize the services of client/server system 430. For instance, functions 466 of wireless communication devices 416 can be similar to the functions described for the mobile device 110 of FIG. 1, in accordance with the methods illustrated in FIGS. 2 and 3.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
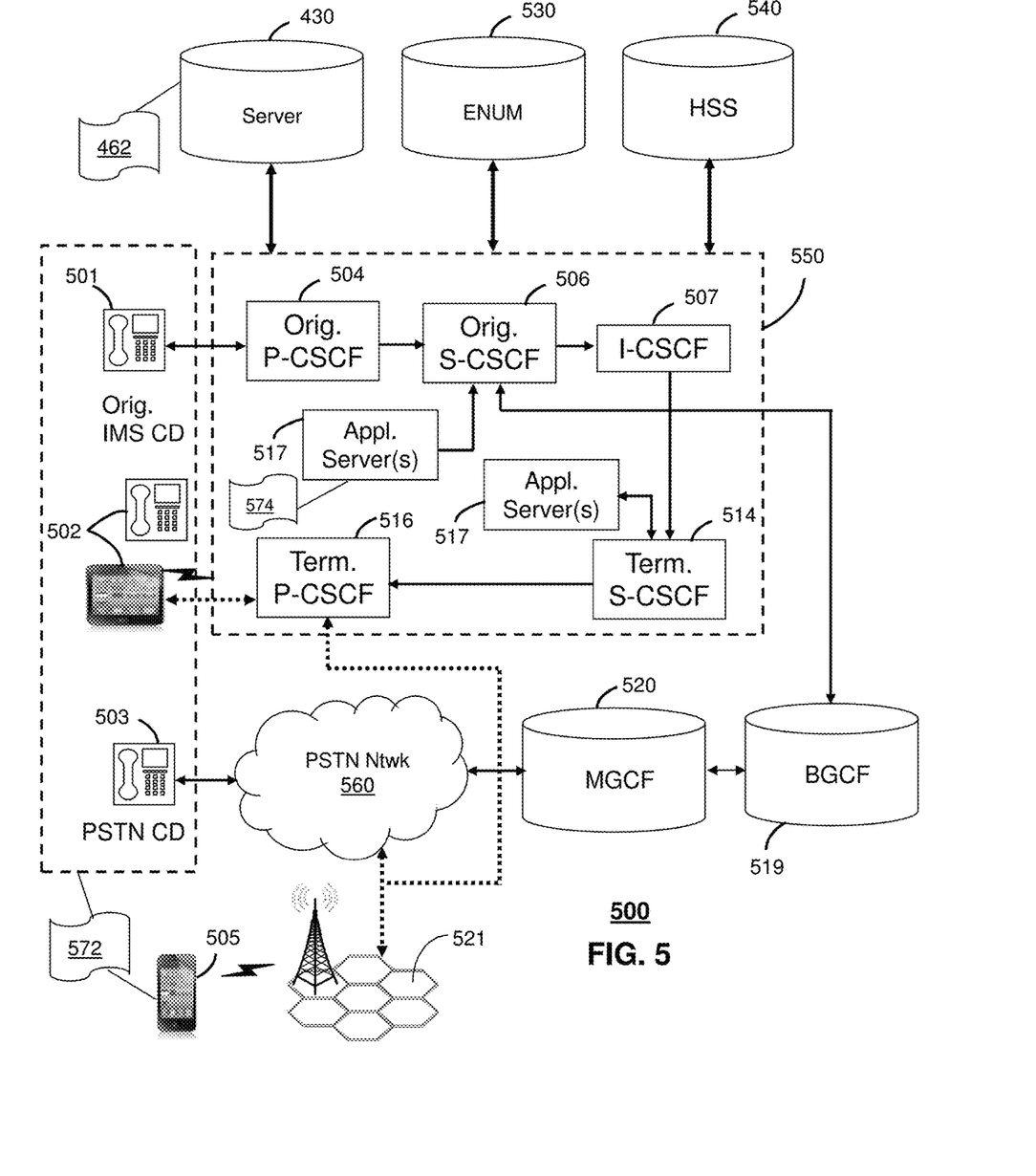

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIG. 1 and communication system 400 as another representative embodiment of communication system 400. Operation and management of communication system 500 can benefit from deployment of several embedded mobile apps combined into a single bundled app 120.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (ASs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The client/server system 430 of FIG. 4 can be operably coupled to communication system 500 for purposes similar to those described above. Client/server system 430 can perform function 462 and thereby provide enterprise data processing services to the CDs 501, 502, 503 and 505 of FIG. 5, similar to the functions described for app server 130, authentication server 140 or client/server(s) 150 of FIG. 1, in accordance with methods illustrated in FIGS. 2 and 3. CDs 501, 502, 503 and 505, which can be adapted with software to perform function 572 to utilize the services of the client/server system 430, and launch a single bundled app 120 including embedded mobile apps 125 that perform similar to the functions described for mobile devices 110 of FIG. 1 in accordance with methods provided in FIGS. 2 and 3. Client/server system 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
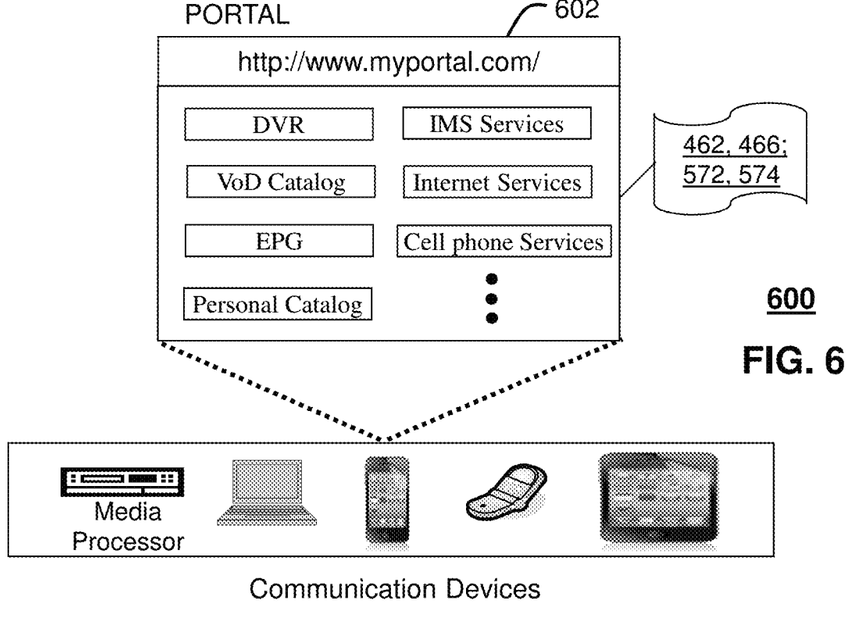
FIG. 6 depicts an illustrative embodiment of a web portal for interacting with the communication systems of a system for managing and operating a plurality of mobile applications embedded into a single bundled application.

FIG. 6 depicts an illustrative embodiment of a web portal 602 of a communication system 600. Communication system 600 can be overlaid or operably coupled with app server 130 and/or client/server(s) 150 of FIG. 1, communication system 400, and/or communication system 500 as another representative embodiment of a system for managing and operating a plurality of mobile applications embedded into a single bundled application of FIG. 1, communication system 400, and/or communication system 500. The web portal 602 can be used for managing services of app server 130 and/or client/server(s) 150 of FIG. 1 and communication systems 400-500. A web page of the web portal 602 can be accessed by a Uniform Resource Locator (URL) with an Internet browser using an Internet-capable communication device such as mobile device 110 described in FIG. 1 and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462 and 466, and 572-574 to adapt these applications as may be desired by subscribers and/or service providers of app server 130 and/or client/server(s) 150 of FIG. 1, and communication systems 400-500. For instance, mobile users of the services provided by app server 130 and/or client/server(s) 150 or client/server system 430 can log into their on-line accounts and provision the app server 130 and/or client/server(s) 150 or client/server system 430 with user profiles, permissions for users, embedded mobile app 125 settings, etc., that provide information to the server to enable it to communication with mobile device 110 described in FIG. 1, and so on. Service providers can log onto an administrator account to provision, monitor and/or maintain the app server 130 and/or client/server(s) 150 or client/server system 430.

Figure 7:
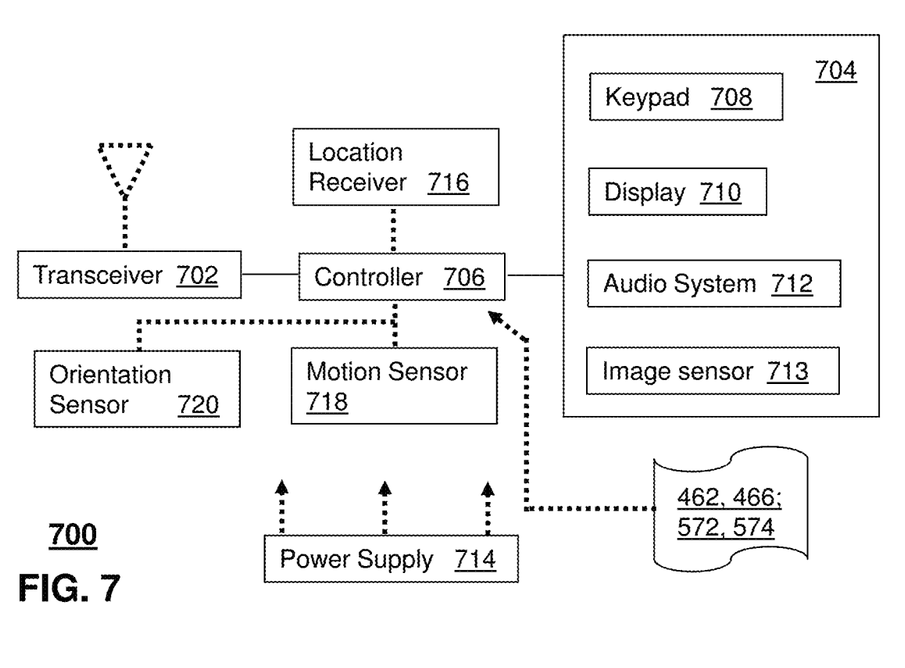
FIG. 7 depicts an illustrative embodiment of a mobile communication device.

FIG. 7 depicts an illustrative embodiment of a mobile device 700. Mobile device 700 can serve in whole or in part as an illustrative embodiment of the mobile device 110 depicted in FIG. 1 and devices of FIGS. 4-5 and can be configured to perform portions of the methods illustrated in FIGS. 2 and 3.

Mobile device 700 can comprise a wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the mobile device 700. The keypad 708 can be an integral part of a housing assembly of the mobile device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the mobile device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the mobile device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the mobile device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the mobile device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the mobile device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the mobile device 700 in three-dimensional space. The orientation sensor 720 can utilize orientation sensing technology such as a magnetometer to detect the orientation of the mobile device 700 (north, south, west, and east, as well as combined orientations in degrees, minutes, or other suitable orientation metrics).

The mobile device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated machine-readable storage medium such as Flash, ROM, RAM, SRAM, DRAM or other storage technologies for executing computer instructions, controlling, and processing data supplied by the aforementioned components of the mobile device 700.

Other components not shown in FIG. 7 can be used in one or more embodiments of the subject disclosure. For instance, the mobile device 700 can include a reset button (not shown). The reset button can be used to reset the controller 706 of the mobile device 700. In yet another embodiment, the mobile device 700 can also include a factory default setting button positioned, for example, below a small hole in a housing assembly of the mobile device 700 to force the mobile device 700 to re-establish factory settings. In this embodiment, a user can use a protruding object such as a pen or paper clip tip to reach into the hole and depress the default setting button. The mobile device 700 can also include a slot for adding or removing an identity module such as a Subscriber Identity Module (SIM) card. SIM cards can be used for identifying subscriber services, executing programs, storing subscriber data, and so forth.

The mobile device 700 as described herein can operate with more or less of the circuit components shown in FIG. 7. These variant embodiments can be used in one or more embodiments of the subject disclosure.

The mobile device 700 can be adapted to perform the functions of the mobile device FIG. 1, the media processor 406, the media devices 408, or the portable communication devices 416 of FIG. 4, as well as the IMS CDs 501-502 and PSTN CDs 503-505 of FIG. 5. It will be appreciated that the mobile device 700 can also represent other devices that can operate in systems of FIG. 1, communication systems 400-500 of FIGS. 4-5 such as a gaming console and a media player. In addition, the controller 706 can be adapted in various embodiments to perform the functions 462, 466; 572, 574, respectively.

Upon reviewing the aforementioned embodiments, it would be evident to an artisan with ordinary skill in the art that said embodiments can be modified, reduced, or enhanced without departing from the scope of the claims described below. For example, the system and method for implementing a single bundled app 120 can be included in any enterprise data processing system where monitoring operational status must be made convenient.

In one embodiment, access to particular apps of the single bundled app 120 can be dynamically adjusted based on various factors, including network conditions, end user device conditions, location, service agreement changes, and so forth. As an example, an icon for a particular app may only be shown and the particular app may only be accessible after one or more criterion are satisfied. For instance, a particular app that utilizes large amounts of bandwidth may be only accessible under certain network conditions.

In another embodiment, changes in the single bundled app 120 (e.g., new apps being provisioned or removed) for a first user or a first end user device can be monitored and a second user or second end user device can be notified of the changes. As an example, the notification can be send to the second end user device to enable the second end user device to request the same changes be made to another single bundled app 120 of the second end user device. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
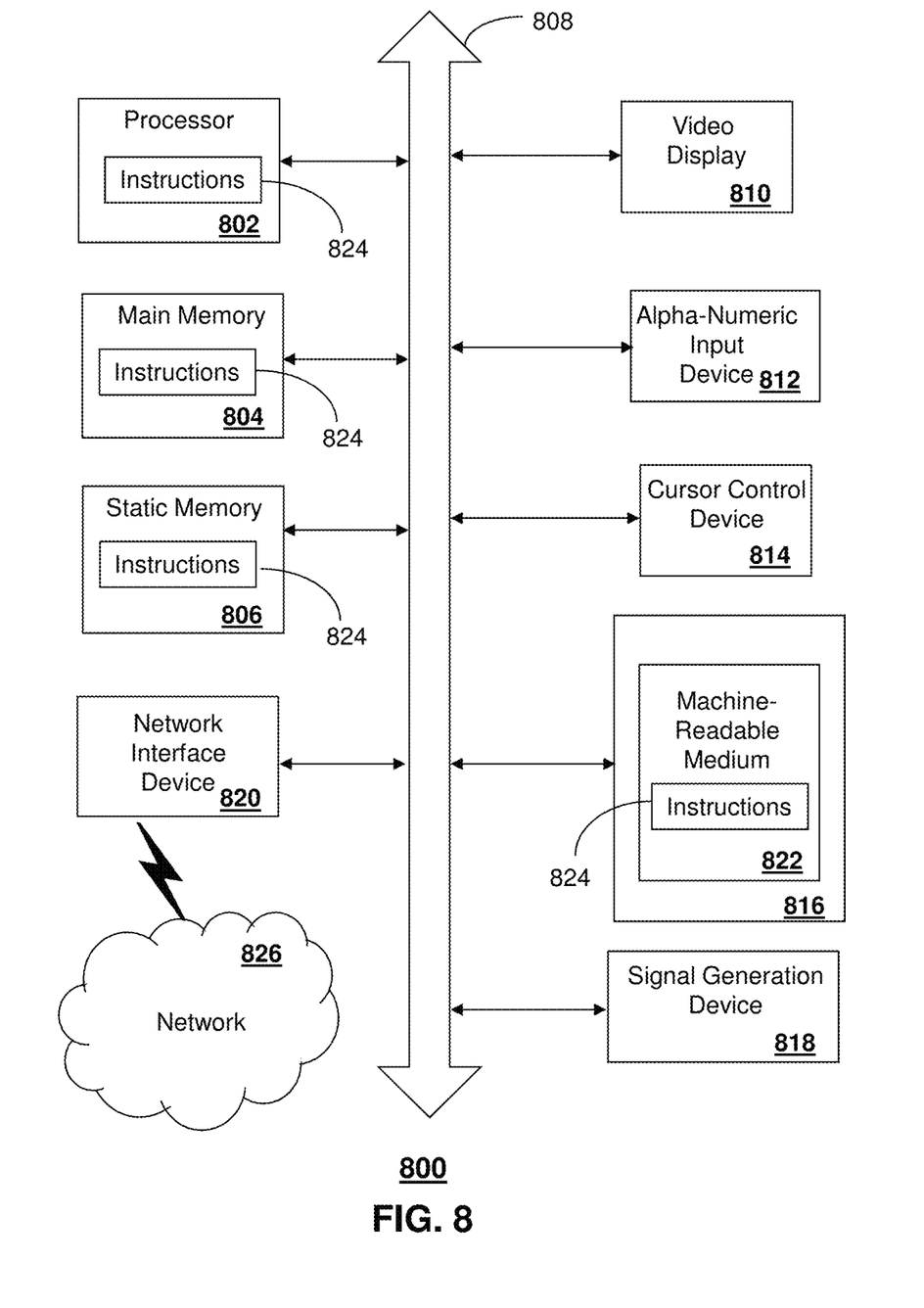
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the app server 130, the authentication server 140, client/server(s) 150, client/server system 430, the media processor 406 and other devices of FIGS. 1, 4-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, and ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A server, comprising:
   a processing system including a processor; and
   a memory that stores executable instructions that, when executed by the processing system, facilitate performance of operations, comprising:
      receiving a request from a mobile device of a user having an account, the request received via a provisioning interface of a single bundled application, the request requesting access to a first mobile application of a plurality of mobile applications embedded into the single bundled application based on the account, and wherein the single bundled application, including the plurality of mobile applications embedded therein, is downloaded onto the mobile device from a source through a data connection;
      determining whether the mobile device has permissions for access to the first mobile application of the plurality of mobile applications in the single bundled application based on the account from permissions data stored in a permissions database;
      sending the permissions data via the provisioning interface to the mobile device, wherein the permissions data enables the mobile device to access the first mobile application responsive to a determination that the single bundled application is executing on the mobile device;
      determining whether the mobile device is executing a second mobile application of the plurality of mobile applications embedded into the single bundled application; and
      responsive to the determining that the mobile device is not executing the second mobile application of the plurality of mobile applications, sending an alert to the mobile device indicating availability of the second mobile application.

2. The server of claim 1, wherein the operations further comprise:
   generating a message notifying an administrator of the request, the mobile device, and the account, responsive to a determination that the mobile device does not have permissions for access to the first mobile application; and
   receiving an update to the permissions database indicating that the account and the mobile device have been granted access to the first mobile application, wherein the update is according to input associated with the administrator logged into the server.

3. The server of claim 2, wherein the operations further comprise: sending a notice to the mobile device that access to the first mobile application has been granted, responsive to a determination that the single bundled application is not executing on the mobile device.

4. The server of claim 1, wherein the operations further comprise:
   receiving a second request from the mobile device via the provisioning interface, the request requesting access to a third mobile application of a plurality of mobile applications;
   determining that the mobile device has access to the third mobile application of the plurality of mobile applications from the permissions database;
   determining whether the mobile device is executing the single bundled application, responsive to a determination that the mobile device has permissions for access to the third mobile application; and
   sending permissions data via the provisioning interface to the mobile device responsive to a determination that the single bundled application is executing on the mobile device, wherein the permissions data enables the mobile device via the account to access the third mobile application.

5. The server of claim 4, wherein the operations further comprise: sending a notice to the mobile device that access to the third mobile application has been granted, responsive to a determination that the single bundled application is not executing on the mobile device.

6. The server of claim 1, wherein the alert is sent via push notification service, and wherein the alert includes alarm information.

7. The server of claim 1, wherein the operations further comprise:
   sending an inquiry to a billing system including the request, the mobile device, and the account, responsive to a determination that the mobile device does not have permissions for access to the first mobile application; and
   receiving an update to the permissions database indicating that the account and the mobile device have been granted access to the first mobile application, wherein the update is according to payment received by the billing system.

8. The server of claim 1, wherein the operations further comprise:
   determining a location for the mobile device; and
   updating the permissions database indicating that the account and the mobile device have been granted access to the first mobile application, wherein the updating is performed based on the location of the mobile device.

9. The server of claim 1, wherein the operations further comprise:
   determining a condition of a mobile network of the mobile device; and
   updating the permissions database indicating that the account and the mobile device have been granted access to the first mobile application, wherein the updating is performed based on the condition of the mobile network.

10. A non-transitory, machine-readable storage medium, comprising executable instructions that, when executed by a mobile device including a processor, facilitate performance of operations, comprising:
   executing a single bundled application on the mobile device, wherein the single bundled application comprises a plurality of mobile applications embedded therein;
   sending authenticating information for a user having an account to an authentication server responsive to executing the single bundled application;
   receiving authorization data from the authentication server based on the account;
   displaying a selection screen for authorized applications of the plurality of mobile applications, wherein the selection screen comprises a user prompt to access a first authorized application of the authorized applications, and wherein the authorized applications displayed are responsive to the authorization data based on the account;
   receiving a selection of the user prompt for a first mobile application of the authorized applications;
   locating application permissions stored on the mobile device;
   launching the first mobile application responsive to locating application permissions stored on the mobile device for the first mobile application; and
   receiving an alert from the authentication server indicating availability of a second mobile application of the plurality of mobile applications of the single bundled application responsive to the authentication server determining that the second mobile application is not executing at the mobile device.

11. The non-transitory, machine-readable storage medium of claim 10, wherein the operations further comprise downloading the single bundled application, including the plurality of mobile applications embedded therein, onto the mobile device.

12. The non-transitory, machine-readable storage medium of claim 10, wherein the operations further comprise:
   sending an indication of the selection of the first mobile application and the authorization data to a provisioning interface of an app server;
   receiving application permissions for the first mobile application from the app server; and
   storing the application permissions on the mobile device.

13. The non-transitory, machine-readable storage medium of claim 12, wherein the operations further comprise receiving application data from a mobile data interface of the app server, wherein the application data is provided based on the authorization data.

14. The non-transitory, machine-readable storage medium of claim 12, wherein the operations further comprise receiving application data from a mobile data interface of the app server, wherein the application data is provided based on the application permissions.

15. The non-transitory, machine-readable storage medium of claim 10, wherein the operations further comprise: updating the first mobile application based on the application permissions.

16. The non-transitory, machine-readable storage medium of claim 15, wherein the updating the first mobile application comprises implementing customized views based on the application permissions.

17. The non-transitory, machine-readable storage medium of claim 10, wherein the processor comprises a plurality of processors operating in a distributed processing environment.

18. A method, comprising:
   receiving, by a server comprising a processing system, a request from a mobile device of a user having an account, the request received via a provisioning interface of a single bundled application, the request requesting access to a first mobile application of a plurality of mobile applications embedded into the single bundled application based on the account, and wherein the single bundled application, including the plurality of mobile applications embedded therein, is downloaded onto the mobile device;
   determining, by the server, whether the mobile device has permissions for access to the first mobile application of the plurality of mobile applications in a permissions database;
   determining, by the server, whether the mobile device is executing the single bundled application based on the account, responsive to a determination that the mobile device has permissions for access to the first mobile application;
   sending, by the server, permissions data via the provisioning interface to the mobile device, wherein the permissions data enables the mobile device to access the first mobile application, responsive to a determination that the single bundled application is executing on the mobile device;
   determining, by the server, whether the mobile device is executing a second mobile application of the plurality of mobile applications embedded into the single bundled application; and
   responsive to the determining that the mobile device is not executing the second mobile application of the plurality of mobile applications, sending, by the server, an alert to the mobile device indicating availability of the second mobile application.

19. The method of claim 18, further comprising:
   generating, by the server, a message notifying an administrator of the request, the mobile device, and the account, responsive to a determination that the mobile device does not have permissions for access to the first mobile application; and
   receiving, by the server, an update to the permissions database indicating that the account and the mobile device have been granted access to the first mobile application, wherein the update is according to input associated with the administrator logged into the server.

20. The method of claim 19, further comprising: sending, by the server, a notice to the mobile device that access to the first mobile application has been granted, responsive to a determination that the single bundled application is not executing on the mobile device.

* * * * *